UNITED STATES PATENT OFFICE.

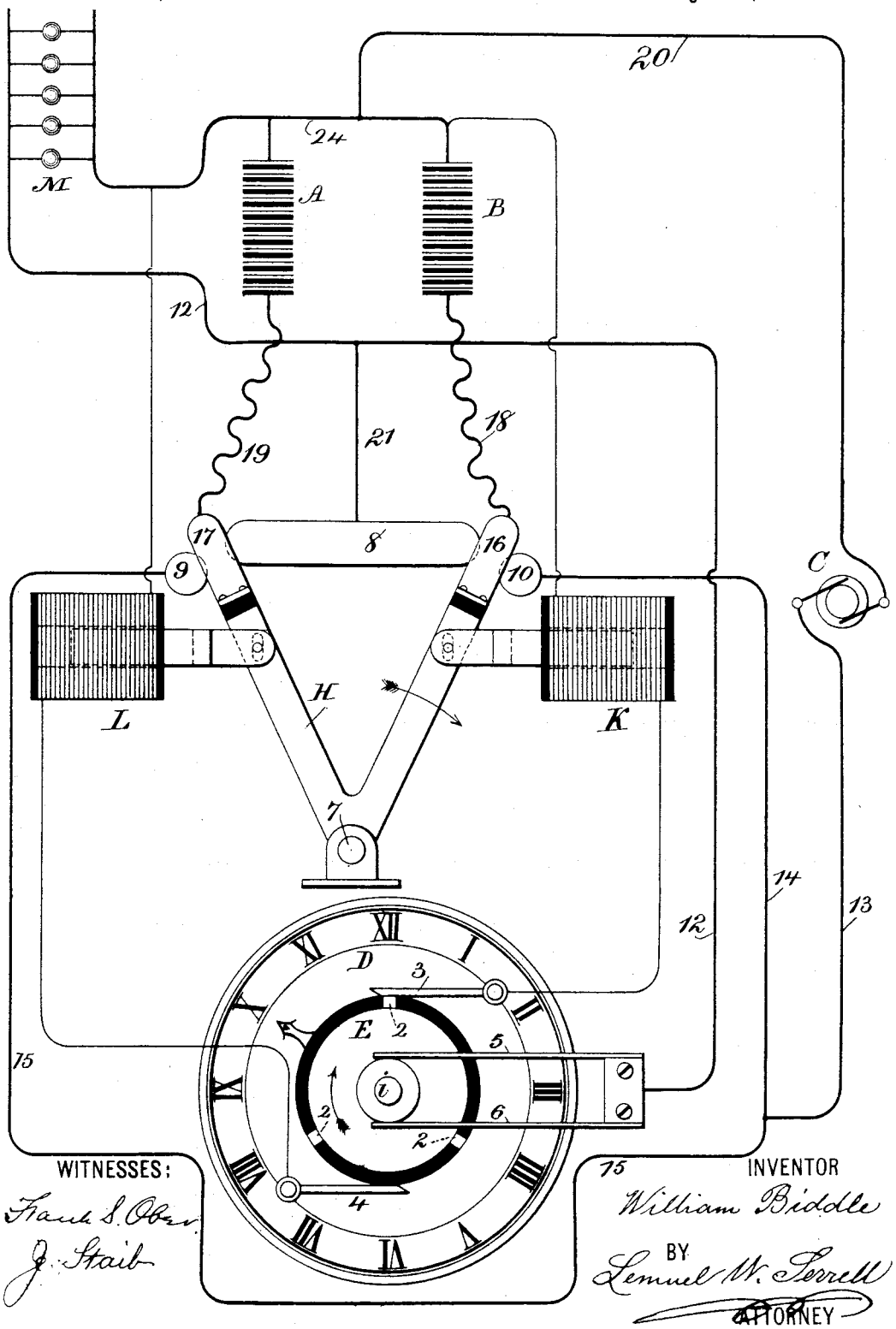

WILLIAM BIDDLE, OF BROOKLYN, NEW YORK.

AUTOMATIC TIME-SWITCH FOR STORAGE-BATTERIES.

SPECIFICATION forming part of Letters Patent No. 539,500, dated May 21, 1895.

Application filed May 18, 1894. Serial No. 511,637. (No model.)

*To all whom it may concern:*

Be it known that I, WILLIAM BIDDLE, a citizen of the United States, residing at Brooklyn, in the county of Kings and State of New York, have invented an Improvement in Automatic Time-Switches for Storage-Batteries, of which the following is a specification.

In lighting railway cars electrically, I have employed a dynamo driven from the car axle and a secondary or storage battery and the current has been automatically directed so as to prevent the storage battery discharging through the armature of the dynamo.

The object of the present invention is to render the action of the secondary battery as nearly uniform as possible and to prevent any connection between the secondary battery that is energizing the lamps and the dynamo. This is accomplished by using two secondary batteries and a switch that is moved by clockwork to connect one battery to the lamps and the other to the dynamo simultaneously, and reverse the connections periodically.

In the drawing I have represented the improvement by a diagram in which the secondary or storage batteries are shown at A B and the armature of a dynamo at C, and at D is illustrated a clock face in which there is a circuit breaking disk E that is rotated by the arbor $i$ of the clock, which arbor $i$ is advantageously the hour hand arbor. The periphery of the disk E is of non-conducting material interrupted at the proper places by circuit closing blocks or contacts 2, and the springs 3 and 4 rest against the edges of this disk, and a spring, or springs 5 6 maintain contact with the metal disk E or its hub.

The switch H is pivoted at 7 and acted upon by the solenoid cores of the helices K, L, and the insulated ends 16 and 17 of the switch make and break the circuits through the contacts 8, 9 or 10.

The working circuit containing the incandescent electric lamps or other translating devices is shown at M, and the circuit connections or wires are substantially as shown so that the rotation of the disk E will switch the currents as follows:

One of the contacts 2 is represented as closing the circuit with 3, and a battery current comes by the wire 12 from the working circuit and by 5, 6, E, 2 and 3 through the helix K, moving the core and switch H from 8 to 10 without breaking one circuit until it makes the other circuit, and when the ends 16 and 17 of the switch rest only on 10 and 8, the armature current passes by 13, 14, 10, 16 and 18 to the secondary battery B, and by 20 to C, thus energizing the battery B. At the same time the current from the battery A passes by 19, 17, 8 and 21 to the working circuit M. As soon as the contact 2 separates from 3, the circuit which is of a high resistance through K is broken but the switch H remains unmoved until a contact 2 comes to the spring 4 closing a circuit from A through 12, 5, 6, E, 2, 4 and through the helix L to the working circuit M, and in so doing the electro-magnet L moves the switch H, changing 16 from 10 to 8, and 17 from 8 to 9, and the current flows from the armature C, through 13, 15, 9, 17 and 19 to the battery A, and by 20 to the armature C to charge the battery A, and the working circuit is completed from the battery B through 18 16, 8 and 21 to 12, M and 24.

It will be understood that according to the number of contacts 2 on the time rotating disk E and the position of the springs 3 and 4, so the circuit connections will be changed at regular intervals of greater or less length. As illustrated, the connections are shown as being changed every two hours, the battery B being connected at ten o'clock to the armature and the battery A to the lamps, and at twelve o'clock the battery A would be connected to the armature and the battery B to the lamps, and so on, but the period of time may be regulated as required.

The construction of the three-point switch H may be varied according to the circumstances of its use.

I claim as my invention—

1. The combination with a working circuit and two secondary batteries and the energizing dynamo, of a time-controlled rotary circuit closer and its contact springs, a three-point circuit-preserving switch, two helices and their cores or armatures standing in opposite directions and connected with the three-point switch, and circuit connections between the secondary batteries and the time controlled circuit closer substantially as specified, whereby the three-point switch is moved by first one secondary battery and then the other, substantially as set forth.

2. The combination with a working circuit, of two secondary batteries and an energizing dynamo, of a time-controlled circuit closer formed of a disk with insulating material and metallic contacts, and springs resting upon such circuit closer, a three-point switch and two electro-magnets and their armature acting in opposite directions, conductors extending from the secondary batteries to the two insulated contacts on the moving switch, and circuit connections to the stationary contacts of such switch, substantially as set forth, whereby the electro-magnets move the switch first in one direction and then in the other by currents through the time-controlled circuit closer, and the circuit through each electro-magnet is broken by the time controlled switch after being closed, substantially as set forth.

Signed by me this 16th day of May, 1894.

WILLIAM BIDDLE.

Witnesses:
GEO. T. PINCKNEY,
A. M. OLIVER.